(12) United States Patent
Yamaguchi et al.

(10) Patent No.: US 11,643,736 B2
(45) Date of Patent: May 9, 2023

(54) ELECTROCHEMICAL CATALYST, ASSEMBLY, ELECTROCHEMICAL REACTOR, HYDROCARBON GENERATION SYSTEM AND METHOD FOR GENERATING HYDROCARBON

(71) Applicant: National Institute of Advanced Industrial Science and Technology, Tokyo (JP)

(72) Inventors: Toshiaki Yamaguchi, Tsukuba (JP); Haruo Kishimoto, Tsukuba (JP); Yohei Tanaka, Tsukuba (JP); Hiroyuki Shimada, Nagoya (JP); Tomohiro Ishiyama, Tsukuba (JP); Ryousuke Atsumi, Koriyama (JP); Yoshinobu Fujishiro, Nagoya (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 117 days.

(21) Appl. No.: 17/280,504

(22) PCT Filed: Oct. 1, 2019

(86) PCT No.: PCT/JP2019/038776
§ 371 (c)(1),
(2) Date: Mar. 26, 2021

(87) PCT Pub. No.: WO2020/071376
PCT Pub. Date: Apr. 9, 2020

(65) Prior Publication Data
US 2022/0025527 A1    Jan. 27, 2022

(30) Foreign Application Priority Data

Oct. 1, 2018    (JP) .............................. JP2018-186655

(51) Int. Cl.
*C25B 3/25*    (2021.01)
*C25B 1/23*    (2021.01)
(Continued)

(52) U.S. Cl.
CPC .................. *C25B 3/25* (2021.01); *C25B 1/04* (2013.01); *C25B 1/042* (2021.01); *C25B 1/23* (2021.01);
(Continued)

(58) Field of Classification Search
CPC .............................................. C25B 3/25–3/26
See application file for complete search history.

(56) References Cited

U.S. PATENT DOCUMENTS 9,118,052 B2    8/2015    Liu et al.
2003/0019762 A1    1/2003    Awano et al.
(Continued)

FOREIGN PATENT DOCUMENTS

EP    3415661 A1 *    12/2018    ............. C01B 3/382
JP    3626971 B2    3/2005
(Continued)

OTHER PUBLICATIONS

Machine translation of Rueger et al (EP 3415661 A1) (Year: 2018).*
(Continued)

*Primary Examiner* — Harry D Wilkins, III
(74) *Attorney, Agent, or Firm* — Locke Lord LLP; James E. Armstrong, IV; Nicholas J. DiCeglie, Jr.

(57) ABSTRACT

The present invention utilizes an electrochemical catalyst which contains: a metal oxide that is composed of one or more compounds selected from among zirconium oxide, cerium oxide, yttrium oxide, gadolinium oxide, samarium oxide, cobalt oxide and scandium oxide; and a metal variant,
(Continued)

which has a valence that is different from the valence of the metal that constitutes the metal oxide.

10 Claims, 4 Drawing Sheets

(51) Int. Cl.
    *C25B 9/70*     (2021.01)
    *C25B 9/67*     (2021.01)
    *C25B 9/19*     (2021.01)
    *C25B 11/091*     (2021.01)
    *C25B 3/26*     (2021.01)
    *C25B 1/042*     (2021.01)
    *C25B 15/02*     (2021.01)
    *C25B 1/04*     (2021.01)

(52) U.S. Cl.
    CPC .................. *C25B 3/26* (2021.01); *C25B 9/19* (2021.01); *C25B 9/67* (2021.01); *C25B 9/70* (2021.01); *C25B 11/091* (2021.01); *C25B 15/02* (2013.01)

(56) References Cited

U.S. PATENT DOCUMENTS

| | | | |
|---|---|---|---|
| 2008/0283411 A1* | 11/2008 | Eastman | F02M 25/12 205/343 |
| 2013/0041051 A1 | 2/2013 | Zuberbuhler et al. | |
| 2016/0053388 A1* | 2/2016 | Reytier | C25B 15/08 422/162 |
| 2016/0355932 A1* | 12/2016 | Reytier | C25B 1/04 |
| 2018/0086984 A1* | 3/2018 | Chen | B01J 23/10 |
| 2019/0194816 A1* | 6/2019 | Bru | C25B 9/75 |
| 2019/0270938 A1* | 9/2019 | Chen | C10G 2/34 |
| 2019/0348699 A1* | 11/2019 | Reytier | H01M 8/0271 |
| 2020/0095124 A1* | 3/2020 | Rueger | C01B 3/382 |

FOREIGN PATENT DOCUMENTS

| | | | | |
|---|---|---|---|---|
| JP | 4822494 B2 | | 11/2011 | |
| JP | 2014152219 A | * | 8/2014 | ............... C10L 1/00 |
| JP | 2017-507239 A | | 3/2017 | |
| KR | 10-2013-0047534 A | | 5/2013 | |
| WO | 2011/076315 A2 | | 6/2011 | |
| WO | 2015/022912 A1 | | 2/2015 | |

OTHER PUBLICATIONS

Machine translation of Sato et al (JP 2014-152219 A) (Year: 2014).*

Mizusawa et al., "Cycle Analysis of a Methanation System with an SOEC Using Co-electrolysis," The Journal of Fuel Cell Technology, vol. 14, No. 4, 2015, and partial English translation thereof. (discussed in the spec).

Luo, Y. et al., "Experimental Characterization and Theoretical Modeling of Methane Production by H2O/CO2 CoElectrolysis in a Tubular Solid Oxide Electrolysis Cell," Journal of the Electrochemical Society, Jul. 17, 2015, vol. 162, pp. F1129-F1134.

Fujiwara, Naoya et al., "Methane synthesis in solid oxide electrolysis cells," Proceeding of Annual/Fall Meetings of the Japan Petroleum Institute, Jan. 16, 2017, vol. 46, 1A12 and partial English translation thereof.

Fujiwara, N. et al., "Cathode Catalysts of Solid Oxide Electrolysis Cells for Direct Methane Synthesis," Proceedings of the 83rd Annual Meeting of the Chemical Society of Japan, Apr. 20, 2018, PA164.

Theleritis, D. et al., "Hydrogenation of CO2 over Ru/YSZ Electropromoted Catalysts," ACS Catalysis, Mar. 16, 2012, vol. 2, pp. 770-780.

International Search Report dated Nov. 19, 2019, issued for PCT/JP2019/038776.

Le Shao, et al., "Optimization of the electrode-supported tubular solid oxide cells for application on fuel cell and steam alectrolysis". International Journal of Hydrogen Energy, No. 38, p. 4272-4280, Feb. 21, 2013.

* cited by examiner

FIG. 3

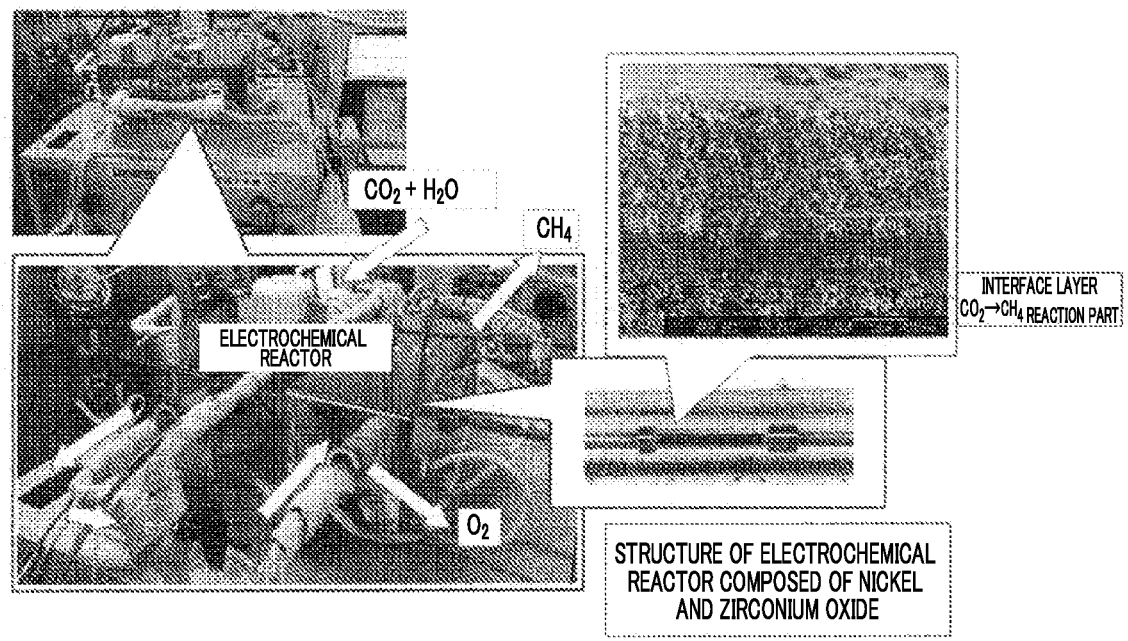

| CONTROL POTENTIAL(V) | CURRENT(mA) | MATERIAL FOR ELECTROCHEMICAL REACTOR STRUCTURE | CONVERSION RATE FROM CARBON DIOXIDE TO METHANE(%) |
|---|---|---|---|
| 0 | 0 | NICKEL/CERIUM OXIDE/ ZIRCONIUM OXIDE MEMBRANE | 0.0 |
| 0 | 0 | NICKEL/CERIUM OXIDE/ CERIUM OXIDE MEMBRANE | 0.0 |
| 1.45 | 525 | NICKEL/CERIUM OXIDE/ ZIRCONIUM OXIDE MEMBRANE | 80.0 |
| 1.45 | 800 | NICKEL/CERIUM OXIDE/ CERIUM OXIDE MEMBRANE | 80.0 |

*REACTION TEMPERATURE: 400 TO 750°C, 1 Bar SPACE VELOCITY: > 5000 h$^{-1}$.

FIG. 4

| GENERATED GAS CONCENTRATION | FE ELECTRODE/ CONTROL POTENTIAL 1.40 V | NI ELECTRODE/ CONTROL POTENTIAL 1.40 V (REFERENCE DATA) |
|---|---|---|
| $CH_4$ | 0.73% | 42.0% |
| CO | 0.91% | 0.2% |
| $C_2H_4$ | 0.0033% | 0% |
| $C_2H_6$ | 0.88% | 0% |
| $C_3H_6$ | 1.74% | 0% |

*HHV (High Heat Vale) IS AN EFFICIENCY VALUE AT A HIGHER HEATING VALUE.

*THERMODYNAMIC CALCULATION VALUE AT CHEMICAL EQUILIBRIUM BASED ON HEAT-MATERIAL BALANCE IN CHEMICAL ENGINEERING PROCESS MODEL USING VALUES OBTAINED FROM EXPERIMENTAL DATA.

*EtoGas/Audi, A REFERENCE VALUE, IS A CALCULATION VALUE USING A 600 kw SYSTEM FROM e-Gas PROJECT IN EUROPE (GERMANY).

ELECTROCHEMICAL CATALYST, ASSEMBLY, ELECTROCHEMICAL REACTOR, HYDROCARBON GENERATION SYSTEM AND METHOD FOR GENERATING HYDROCARBON

TECHNICAL FIELD

The present invention relates to an electrochemical reactor configured to synthesize a hydrocarbon such as methane from carbon dioxide molecules and water, and an electrochemical catalyst and an assembly, which are used for the electrochemical reactor, a hydrocarbon generation system, and a method for generating a hydrocarbon.

BACKGROUND ART

In recent years, it has been desired to establish an energy carrier technique, in which utilizing electric power such as regenerative energy, a carbon source such as carbon dioxide and a hydrogen source such as water e.g. water vapor in the atmosphere and exhaust gas are recycled and newly converted into a chemical which can be used, for storage and transport.

For example, it becomes possible to synthesize methane, which is used as a raw material for synthesizing a chemical and a city gas component, and the like, by bringing oxygen from a carbon dioxide molecule and a water molecule into a metal oxide material and allowing carbon and hydrogen to chemically react.

In conventional chemical catalysts, absorption and desorption in a reaction field formed by the chemical action on the surface of a material, and a reaction due to shifts in chemical reaction equilibrium are utilized. Patent Documents 1-3 and Non-Patent Document 1, for example, describe e.g. a carbon dioxide reduction system that combines an electrolytic hydrogen reactor and a chemical catalyst reactor, and the reduction of e.g. nitrogen oxides intended for exhaust gas purification.

Patent Document 1: Japanese Patent No. 3626971
Patent Document 2: Japanese Patent No. 4822494
Patent Document 3: PCT International Publication No. WO2011/076315
Non-Patent Document 1: Mizusawa et al., Cycle Analysis of a Methanation System with an SOEC Using Co-electrolysis, The Journal of Fuel Cell Technology, Vol. 14, No. 4, 201582

DISCLOSURE OF THE INVENTION

Problems to be Solved by the Invention

Although the conventional chemical catalysts as described above are suitable for large-scale synthesis, it involves a problem of large energy losses such that energy efficiency is about 60% or less when hydrogen production (electrolysis) and a carbon dioxide reduction catalyst are combined. There is also a problem in that reaction control is difficult due to the design limitations of equilibrium reaction when changes in the composition of raw material introduced are large, for example.

The present invention was made in view of the circumstances as described above, and a subject thereof is to provide an electrochemical reactor which can synthesize e.g. methane and C2-C4 hydrocarbons from carbon dioxide and water at high energy efficiency and which has excellent reaction control properties even when changes in the composition of raw material introduced are large, and an electrochemical catalyst, an assembly, which are used for the electrochemical reactor, and a method for generating a hydrocarbon.

Means for Solving the Problems

The electrochemical catalyst of the present invention is an electrochemical catalyst for generating a hydrocarbon from carbon dioxide and water, the electrochemical catalyst including a metal oxide composed of one or two or more of zirconium oxide, cerium oxide, yttrium oxide, gadolinium oxide, samarium oxide, cobalt oxide and scandium oxide; and a metal variant, having a valence different from that of a metal composing the metal oxide.

In the electrochemical catalyst, the metal variant is preferably a rare earth metal.

The assembly of the present invention is an assembly, which can be used as an electrode of an electrochemical reactor, being configured to generate a hydrocarbon from carbon dioxide and water, in which the electrochemical catalyst and a conductive metal joined with each other to form an interface.

The electrochemical reactor of the present invention is an electrochemical reactor, being configured to generate a hydrocarbon from carbon dioxide and water, the electrochemical reactor including an oxygen-permeable electrolyte membrane, as well as a cathode and an anode disposed to either side of the electrolyte membrane, in which the cathode is composed of the assembly according to claim 3.

The hydrocarbon generation system of the present invention is a hydrocarbon generation system, including a co-electrolysis cell and a hydrocarbon generation cell each connected to an external power source, in which each of the co-electrolysis cell and the hydrocarbon generation cell has the electrochemical reactor.

The method for generating a hydrocarbon of the present invention is a method for generating a hydrocarbon by the hydrocarbon generation system, the method including:

a first step of generating carbon monoxide and hydrogen by introducing a gas including carbon dioxide and water into the heated co-electrolysis cell, and abstracting oxygen from the carbon dioxide and the water; and a second step of generating the hydrocarbon by introducing a gas including carbon monoxide and hydrogen generated in the first step into the heated hydrocarbon generation cell, wherein each surface potential of each electrochemical catalyst in the co-electrolysis cell and the hydrocarbon generation cell is controlled by the external power source in the first step and in the second step.

In the method for generating a hydrocarbon, it is preferred that the co-electrolysis cell be heated to 600° C. to 800° C. in the first step, and the hydrocarbon generation cell be heated to 300° C. to 400° C. in the second step, and each surface potential of each electrochemical catalyst be controlled to 1.00 V to 1.50 V in the first step and in the second step.

Effects of the Invention

The electrochemical catalyst and assembly of the present invention can be utilized for the electrochemical reactor and method for generating a hydrocarbon of the present invention, and the electrochemical reactor and the method for generating a hydrocarbon of the present invention makes it possible to synthesize e.g. methane and C2-C4 hydrocarbons from carbon dioxide and water at high energy efficiency and are also excellent in terms of reaction control properties.

BRIEF DESCRIPTION OF THE DRAWINGS

FIG. 3 shows the structure outline of the electrochemical reactor of the present invention, and the characteristics comparison of methane synthesis on test conditions in Examples;

FIG. 4 is a drawing showing the effects of conductive metals, which are joined to an electrochemical catalyst in the assembly of the present invention, on reaction products.

PREFERRED MODE FOR CARRYING OUT THE INVENTION

Figure 1:
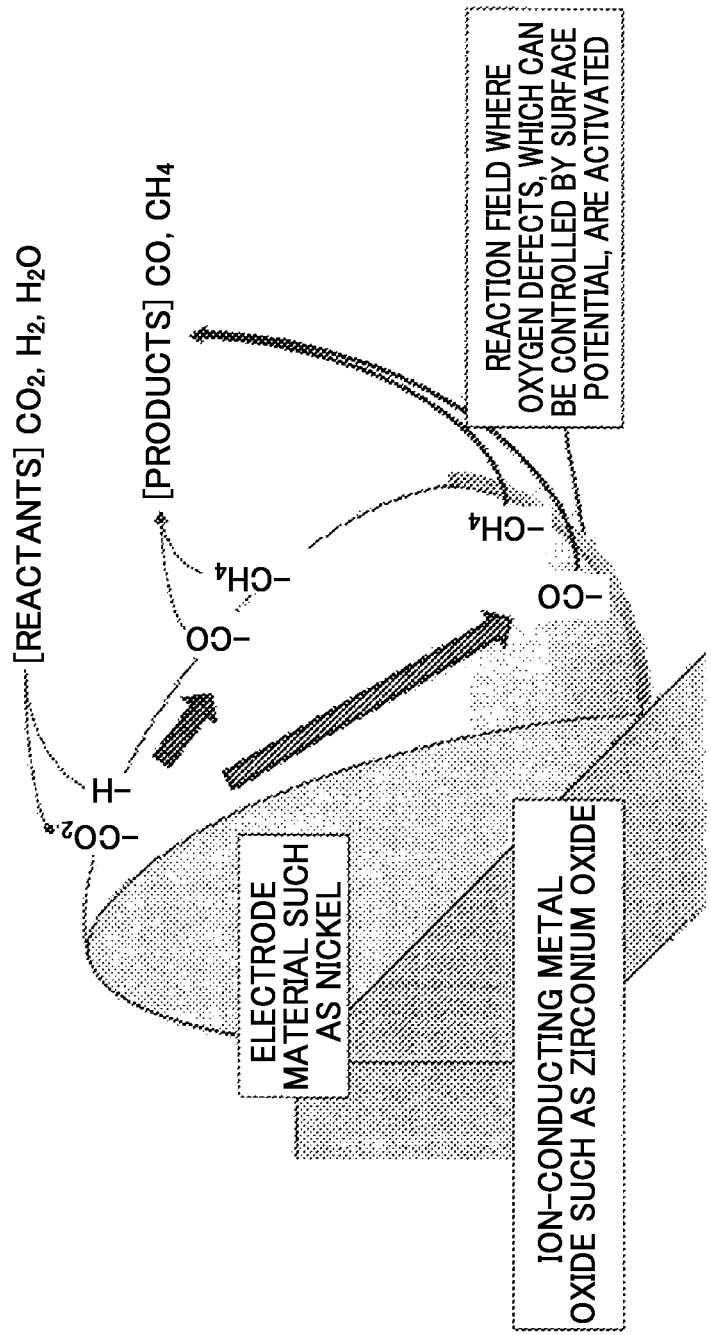
FIG. 1 is a schematic diagram illustrating a structure of the assembly of the present invention, which can be controlled by an external power source to synthesize e.g. methane from carbon dioxide and water.

One embodiment of the electrochemical reactor of the present invention will be described, together with the electrochemical catalyst and assembly, which are used for the electrochemical reactor, and hydrocarbon generation system. It should be noted that when value ranges and the like are shown with "~" in the description, values at both ends thereof are included.

The electrochemical reactor of the present invention makes it possible to generate methane and C2-C4 hydrocarbons and the like, which can be used as a raw material for synthesizing a chemical, a city gas component and the like, for example by introducing a carbon source such as carbon dioxide and a hydrogen source such as water e.g. water vapor in the atmosphere and exhaust gas and allowing them to chemically react.

Suitable examples of the form of the electrochemical reactor in the present invention include conventionally known forms such as tubular, plate and honey-comb forms; and are particularly preferable to have one or more through holes with a pair of openings, such as tubular and honey-comb forms, and a chemical reaction part formed in each through hole.

A structure having chemical reaction parts arranged in one direction along a gas channel, for example, can be provided as an example.

The electrochemical reactor of the present invention is connected to an external power source and can be heated to a predetermined temperature, and the surface potential of an electrochemical catalyst can also be controlled.

The electrochemical reactor of the present invention includes an electrolyte membrane and a cathode and an anode placed facing each other across this electrolyte membrane.

The electrolyte membrane is not particularly limited as long as it is an oxygen-permeable electrolyte membrane through which a gas does not pass and only oxygen ion can pass. Oxygen ion generated in the cathode passes from the cathode side through the electrolyte membrane and is pumped into the anode side due to potential differences. Specific examples of the electrolyte membrane can include zirconium oxide, cerium oxide, particularly zirconia stabilized with yttria or scandium oxide, ceria stabilized with gadolinium oxide or samarium oxide, lanthanum gallate and the like.

The cathode is an assembly in which an electrochemical catalyst and a conductive metal are joined with each other to form an interface.

The electrochemical catalyst of the present invention includes a metal oxide composed of one or two or more of zirconium oxide, cerium oxide, yttrium oxide, gadolinium oxide, samarium oxide, cobalt oxide and scandium oxide, and a metal variant, which has a valence different from that of a metal composing this metal oxide.

The metal oxide forms oxygen defects on the surface thereof due to oxide ion-conducting function.

In addition, the metal variant is preferably a divalent or trivalent rare earth metal oxide, and examples thereof can include yttria, scandium oxide, gadolinium oxide, samarium oxide and the like. That is, preferred examples of the electrochemical catalyst can include zirconium oxide in which yttria (trivalent) as the metal variant is dissolved (yttria stabilized zirconia), cerium oxide in which gadolinium oxide (trivalent) as the metal variant is dissolved and the like.

The conductive metal is not particularly limited and can be selected depending on hydrocarbons to be generated, and examples thereof can include one or two or more of nickel, cobalt, iron, silver, copper, platinum, palladium and the like.

The method for joining the electrochemical catalyst and the conductive metal, the ratio of them, and the like are not particularly limited. Examples thereof can include a method in which conductive particles with a particle diameter of 0.1 μm to 1.0 μm and an electrochemical catalyst are mixed at a volume ratio of conductive particles:electrochemical catalyst=30:70 to 70:30, and the obtained mixture is kneaded with water and a binder, followed by extrusion molding, and the like.

The anode is not particularly limited as long as it is a material which has been conventionally used in this area, and examples thereof can include lanthanum-strontium-cobalt-iron oxide (LSCF), LSCF-GDC (gadolinia doped ceria), lanthanum strontium manganite (LSM), lanthanum strontium cobaltite (LSC), samarium strontium cobaltite (SSC) and compounds thereof and the like.

As described above, in the electrochemical reactor of the present invention, an assembly that constitutes a cathode has an interface formed by joining an electrochemical catalyst and a conductive metal. The conductive metal is joined in an adequate amount in order to form an interface to apply a local electrochemical stress on the electrochemical catalyst and allow oxide ions to move easily.

Due to oxide ion-conducting function, oxygen defects are formed on the surface when carbon dioxide and water are introduced into the electrochemical reactor heated to a predetermined temperature and the surface potential of the electrochemical catalyst (metal oxide) is controlled to a predetermined range by an external power source. Therefore, the interface of the metal oxide and the conductive metal functions as a reaction field, and oxygen is abstracted from carbon dioxide and water into the metal oxide, thereby making it possible to synthesize methane and C2-C4 hydrocarbons and the like can be synthesized at high energy efficiency (60% or more), depending on conditions, by the reaction of CO and water at a ratio (S/C) of water and carbon of 3.5 or less.

In addition, the electrochemical reactor of the present invention allows oxygen defects due to the electrochemical catalyst to be controlled freely and precisely by electrochemically controlling potential on the surface of the metal oxide by an external power source, and is excellent in reaction control properties even when the composition of introduced raw material changes largely. The electrochemical catalyst in the electrochemical reactor of the present invention makes it possible to control abstraction and supply of oxygen kinetically by electrochemical control from the outside unlike conventional industrial catalysts.

Because the electrochemical catalyst includes a metal variant, which has a valence different from that of a metal that composes the metal oxide, oxygen defects due to the metal oxide can be formed more stably and easily and the generation of hydrocarbons can be controlled precisely.

In addition, the hydrocarbon generation system of the present invention is equipped with a co-electrolysis cell and a hydrocarbon generation cell placed downstream thereof, each connected to an external power source, and the co-electrolysis cell and the hydrocarbon generation cell have the above-described electrochemical reactor of the present invention.

The co-electrolysis cell can generate carbon monoxide and hydrogen by abstracting oxygen from introduced carbon dioxide and water. The hydrocarbon generation cell is placed downstream of the co-electrolysis cell, and carbon monoxide and hydrogen generated in the co-electrolysis cell can be introduced thereinto to generate hydrocarbons and the like.

In the co-electrolysis cell and the hydrocarbon generation cell, the temperature and the surface potential of the electrochemical catalyst are controlled by an external power source. The temperature of the co-electrolysis cell at the time of reaction is preferably 600° C. to 800° C. and more preferably 650° C. to 800° C. The surface potential of the electrochemical catalyst is preferably 1.00 V to 1.40 V and more preferably 1.35 V to 1.40 V. In addition, the temperature of the hydrocarbon generation cell at the time of reaction is preferably 300° C. to 400° C. and more preferably 350° C. to 400° C. The surface potential of the electrochemical catalyst is preferably 1.00 V to 1.40 V and more preferably 1.35 V to 1.40 V. Because the reaction in the co-electrolysis cell is an endothermic reaction and the reaction in the hydrocarbon generation cell is an exothermic reaction, reaction proceeds separatory in two stages of the co-electrolysis cell and hydrocarbon generation cell, and thus energy efficiency in hydrocarbon generation can be increased.

Next, one embodiment of the method for generating a hydrocarbon of the present invention will be described.

The method for generating a hydrocarbon of the present invention utilizes a hydrocarbon generation system equipped with a co-electrolysis cell and a hydrocarbon generation cell, each connected to an external power source, and the co-electrolysis cell and the hydrocarbon generation cell have the above-described electrochemical reactor of the present invention.

The method for generating a hydrocarbon of the present invention includes the following first step and second step.

In the first step, a gas including carbon dioxide and water is introduced into the heated co-electrolysis cell. The heating temperature is preferably 600° C. to 800° C. and more preferably 650° C. to 800° C. In addition, in the first step, the surface potential of the electrochemical catalyst in the co-electrolysis cell can be controlled by the external power source, and the surface potential of the electrochemical catalyst at this time is preferably 1.00 V to 1.40 V and more preferably 1.35 V to 1.40 V.

In the first step, oxygen defects due to the electrochemical catalyst can be controlled freely and precisely by electrochemically controlling potential on the surface of the metal oxide by an external power source, and also the interface of the metal oxide and the conductive metal functions as a reaction field, and oxygen is abstracted from carbon dioxide and water into the metal oxide thereby. When the heating temperature in the co-electrolysis cell and the surface potential of the electrochemical catalyst are within the above-described ranges, carbon monoxide and hydrogen can be generated certainly and efficiently.

In the second step, a hydrocarbon is generated by introducing a gas including carbon monoxide and hydrogen generated in the first step into the heated hydrocarbon generation cell. The heating temperature is preferably 300° C. to 400° C. and more preferably 350° C. to 400° C. In addition, in the first step, the surface potential of the electrochemical catalyst in the co-electrolysis cell can be controlled by the external power source, and the surface potential of the electrochemical catalyst at this time is preferably 1.00 V to 1.40 V and more preferably 1.35 V to 1.40 V.

In the second step, methane, C2-C4 hydrocarbons and the like can be synthesized at high energy efficiency (60% or more), depending on conditions, by the reaction of carbon monoxide and hydrogen generated in the first step. When the heating temperature in the hydrocarbon generation cell and the surface potential of the electrochemical catalyst are within the above-described ranges, hydrocarbons such as methane can be stably generated from carbon dioxide and hydrogen.

The electrochemical catalyst, assembly, electrochemical reactor, hydrocarbon generation system and method for generating a hydrocarbon of the present invention are not limited to the above embodiment.

EXAMPLES

The present invention will now be described in more detail by way of examples. It should be noted, however, that the present invention is not limited to these examples.

Example 1

An electrochemical reactor equipped with an assembly including an electrochemical catalyst and a conductive metal was produced in accordance with the procedure described below.

The employed electrochemical catalysts were solid solution of zirconium oxide with yttria (trivalent) as a metal variant or solid solution of cerium oxide with gadolinium (trivalent). The metal variant such as yttria (trivalent) or gadolinium (trivalent) can stabilize oxygen defects due to the electrochemical catalyst.

Specifically, a mixture of nickel oxide particles (conductive metal) with a diameter of several μm or less, which transmit potential from an external power source to zirconium oxide, and zirconium oxide particles as an electrochemical catalyst (volume ratio 50:50) was kneaded with water and a cellulosic binder, and a pipe-shaped molded body was produced as an assembly by extrusion molding.

Furthermore, an ink, obtained by dispersing zirconium oxide or cerium oxide powder in a solvent such as α-terpineol, was applied thereto so that a minute oxygen-permeable electrolyte membrane (membrane of zirconium oxide or cerium oxide, through which a gas does not pass and only oxygen ion passes) had a thickness of 50 μm or less, and it was burned with the assembly at 1400° C. or lower.

A mixed conductive metal oxide electrode (anode) having electron conducting and ion conducting functions was applied on the electrolyte membrane, and they were joined by burning. The electrochemical reactor equipped with these was used for validation.

Example 2

Figure 2:
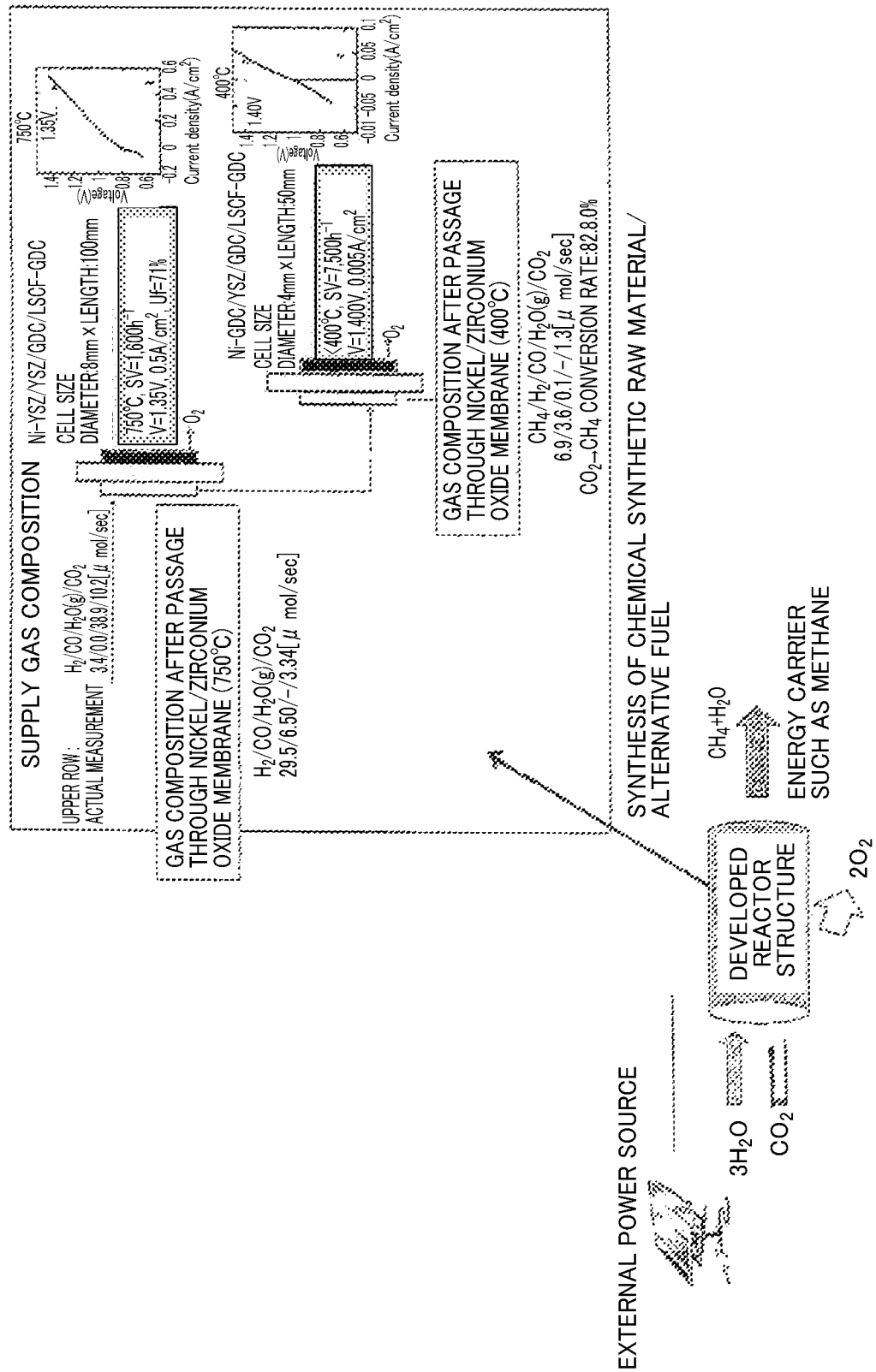
FIG. 2 is a schematic diagram illustrating one embodiment of the electrochemical reactors of the present invention, which can be controlled by an external power source to synthesize e.g. methane from carbon dioxide and water.

As shown in FIG. 2, the produced electrochemical reactors were constituted to a co-electrolysis cell (Ni-YSZ/YSZ/GDC/LSCF-GDC) and a hydrocarbon generator (Ni-GDC/YSZ/GDC/LSCF-GDC), and arranged in one direction along the gas channel. It should be noted that as described above, the metal oxide membrane that forms the cathodes of the electrochemical reactor and the hydrocarbon generator may be one or two or more of zirconium oxide, cerium oxide, yttrium oxide, gadolinium oxide, samarium oxide, cobalt oxide and scandium oxide, and among these, preferred examples thereof can include zirconium oxide in which yttria (trivalent) is dissolved (yttria stabilized zirconia) and gadolinia doped ceria in which gadolinium oxide (trivalent) is dissolved as shown in FIG. 2.

The co-electrolysis cell in the first step of this electrochemical reactor was heated to 750° C., and the hydrocarbon generation cell, where methanation and the like is carried out, in the second step was heated to 400° C. Hydrogen was introduced, and nickel oxide was reduced to metallic nickel so that the potential of zirconium oxide or cerium oxide, an electrochemical catalyst, could be changed from the outside. Next, carbon dioxide and water vapor were introduced, the surface potential of the electrochemical catalyst was controlled by changing the potential by about 0 to 1.5 V from the outside, and the product was evaluated by gas chromatography. In the test, a supply gas including carbon dioxide and water was allowed to flow into the electrochemical reactor with a volume of 0.0086 m$^3$ at a flow rate of 43 Nm$^3$/h, and the space velocity was adjusted to 5000 h$^{-1}$ for the test.

In FIG. 3, changes in reactants at the outlet by changing the voltage in an external power source are shown. It could be verified that when potential was not applied to the electrochemical catalyst, a gas having the same composition as of the raw material was ejected as the reactant; on the other hand, when electricity flowed into the electrochemical reactor and the surface potential of the structure was controlled to 1.4 V or more from the outside at 400 to 750° C., at which the surface potential of the electrochemical catalyst is changed, methane synthesized directly from carbon dioxide and water was generated from the outlet. Furthermore, when the potential was returned to 0 V, the generation of methane was stopped, and it was verified that methane was synthesized from carbon dioxide and water by control using an external power source.

In addition, oxygen abstracted from carbon dioxide and water was simultaneously ejected at a high purity from the electrolyte membrane of the electrochemical reactor with increases in the potential. Similarly, when the power source was off, the generation of oxygen was also stopped. Particularly, in an assembly utilizing a zirconium oxide membrane, a methane generation reaction could be controlled by reaction at a smaller amount of electricity.

Sabatier reaction is conventionally known, in which when carbon dioxide and hydrogen are allowed to react in the presence of an industrial nickel catalyst while applying pressure with several atmospheres, carbon dioxide is reduced by hydrogen to generate carbon monoxide, and the carbon monoxide reacts with water to synthesize methane. It is conceivable that in Examples of the present invention, carbon monoxide was generated by abstracting oxygen electrochemically, and instantly reacts with water to generate methane as is the case of the Sabatier reaction (reaction conditions: 400° C. or lower, 30 atmospheres=30 GPa); however, as shown in FIG. 3, it was found that the amount of methane products was high compared to that by a nickel catalyst industrially used and the reaction proceeded at an ordinary pressure (1 atmosphere=0.1 GPa). It was also verified that the amount of generated methane products was changed by changes in the voltage of external power source and the amount of generation reaction could be controlled.

Example 3

The influence on products by controlling the structure of the electrochemical catalyst was verified as described below. In the method in Example 1, the type of conductive metal joined to the electrochemical catalyst was changed from nickel to iron to produce an electrochemical reactor, and the same test as in Example 2 was carried out.

As a result, it could be verified that when changing a metallic electrode which controls three-phase interface control in the electrochemical catalyst (the kind of conductive metal), C2 and C3 hydrocarbon compounds such as ethane and propylene other than methane were generated as shown in FIG. 4. It was also verified that when the surface potential of the electrochemical catalyst was changed by an external power source, chemical species generated were also changed, and products in chemical reaction could be controlled by controlling the external power source.

Example 4

The energy efficiency in methane synthesis with respect to the amount of energy input was estimated based on the experimental data in Examples above as shown in Table 1.

TABLE 1

Input energy amount and estimated efficiency in methane synthesis

| | Energy (kW) required when methane is synthesized from carbon dioxide at 1.0 mol/min | System efficiency (%) in synthesis reaction |
|---|---|---|
| Case where methane is synthesized by reaction of hydrogen synthesized by e.g., water electrolysis and carbon dioxide using a chemical catalyst (Sabatier catalyst). (pervious art) | 23 | 54-60 |
| Case where methane is synthesized directly from carbon dioxide and water by control using an external power. (The present invention) | 18 | 83-90 |

References for thermodynamic calculation formula: Christopher Graves, Sune D. Ebbesen, Mogens Mogensen, Klaus S. Lackner: Sustainable hydrocarbon fuels by recycling $CO_2$ and $H_2O$ with renewable or nuclear energy, Renewable and Sustainable, Energy Reviews, 15, 1-23 (2011), and the like Several kW class system in which carbon dioxide and water are introduced at a space velocity of 5000 $h^{-1}$ was supposed as the electrochemical reactor using the electrochemical catalyst of the present invention, and the energy efficiency was estimated considering energy consumption and the like in pumps and auxiliary machines such as water removal.

Figure 5:
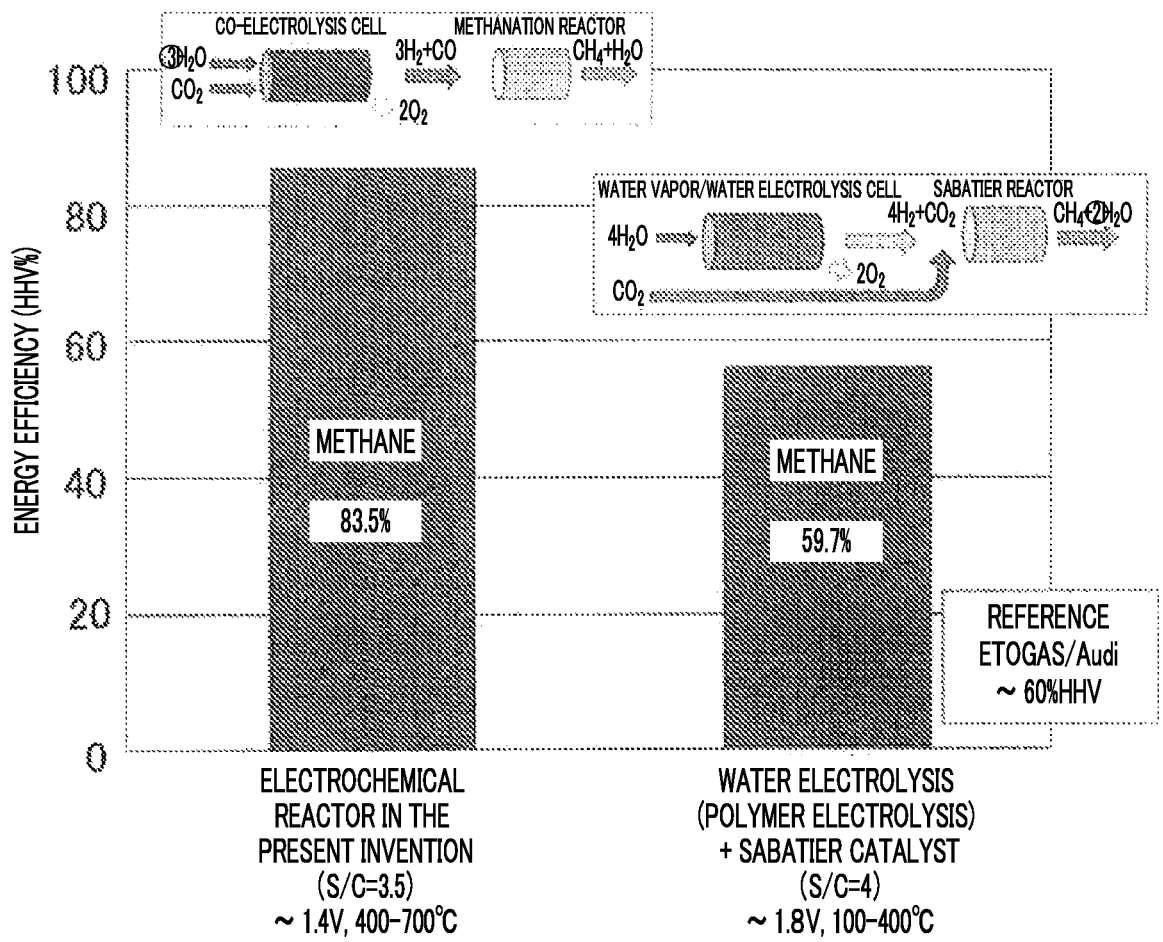
FIG. 5 is a drawing showing the comparison of energy efficiency between a system using the electrochemical reactors of the present invention (hydrocarbon generation system) and a previous art (Sabatier reaction catalyst) in methane synthesis.

As shown in FIG. 5, the methane synthesis in the methane Sabatier reaction had an energy efficiency of less than 60%, and also a system efficiency obtained by multiplying the highest electrolysis efficiency (~90%) of an electrolytic device for synthesizing hydrogen from water, which has the highest efficiency reported as an industrial product, by a chemical catalyst reaction efficiency of 60% considering heat losses was (90%×60%=about 54%). On the other hand, the electrochemical reactors of the present invention, in which methane was synthesized directly from carbon dioxide and water by an electrochemical catalyst, had an energy efficiency of 80% or more. It was thus verified that energy losses could be suppressed. Therefore, the electrochemical reactor of the present invention makes it possible to synthesize a hydrocarbon such as methane from carbon dioxide and water at high efficiency utilizing the electric power of renewable energy more efficiently.

INDUSTRIAL APPLICABILITY

The present invention is industrially used in plants and device techniques for carbon resource recycling such as Power-to-Gas, in which chemical raw materials and fuel such as methane are synthesized directly from carbon dioxide in air and carbon dioxide and water in reaction gas or combustion gas at high efficiency utilizing the electric power of renewable energy.

The invention claimed is:

1. A hydrocarbon generation system, comprising a co-electrolysis cell and a hydrocarbon generation cell,
   wherein the co-electrolysis cell is configured to generate carbon monoxide and hydrogen by abstracting oxygen from introduced carbon dioxide and water,
   the hydrocarbon generation cell is placed downstream of the co-electrolysis cell and is configured to generate hydrocarbon by introducing the carbon monoxide and the hydrogen generated in the co-electrolysis cell,
   each of the co-electrolysis cell and the hydrocarbon generation cell has an electrochemical reactor;
   the electrochemical reactor comprising:
      an oxygen-permeable electrolyte membrane, as well as
      a cathode and an anode disposed to either side of the electrolyte membrane,
      wherein the cathode is composed of an assembly;
      the assembly comprising an electrochemical catalyst and a conductive metal joined with each other to form an interface; and
      the electrochemical catalyst comprising:
         a metal oxide composed of one or two or more of zirconium oxide, cerium oxide, yttrium oxide, gadolinium oxide, samarium oxide, cobalt oxide and scandium oxide; and
         a metal variant, having a valence different from that of a metal composing the metal oxide;
   wherein the co-electrolysis cell and the hydrocarbon generation cell are each connected to an external power source to control the temperature of the electrochemical reactor and the surface potential of the electrochemical catalyst.

2. The hydrocarbon generation system according to claim 1, wherein the metal variant is a rare earth metal.

3. A method for generating a hydrocarbon by the hydrocarbon generation system according to claim 2,
   the method comprising:
   a first step of generating carbon monoxide and hydrogen by introducing a gas comprising carbon dioxide and water into the co-electrolysis cell heated, and abstracting oxygen from the carbon dioxide and the water; and
   a second step of generating the hydrocarbon by introducing a gas comprising the carbon monoxide and the hydrogen generated in the first step into the hydrocarbon generation cell heated,
   wherein each surface potential of each electrochemical catalyst in the co-electrolysis cell and the hydrocarbon generation cell is controlled by the external power source in the first step and in the second step.

4. The method for generating a hydrocarbon according to claim 3,
   wherein the co-electrolysis cell is heated to 600° C. to 800° C. in the first step, and the hydrocarbon generation cell is heated to 300° C. to 400° C. in the second step, and
   each surface potential of each electrochemical catalyst is controlled to 1.00 V to 1.50 V in the first step and in the second step.

5. A method for generating a hydrocarbon by the hydrocarbon generation system according to claim 1,
   the method comprising:
   a first step of generating carbon monoxide and hydrogen by introducing a gas comprising carbon dioxide and water into the co-electrolysis cell heated, and abstracting oxygen from the carbon dioxide and the water; and
   a second step of generating the hydrocarbon by introducing a gas comprising the carbon monoxide and the hydrogen generated in the first step into the hydrocarbon generation cell heated,
   wherein each surface potential of each electrochemical catalyst in the co-electrolysis cell and the hydrocarbon generation cell is controlled by the external power source in the first step and in the second step.

6. The method for generating a hydrocarbon according to claim 5,
   wherein the co-electrolysis cell is heated to 600° C. to 800° C. in the first step, and the hydrocarbon generation cell is heated to 300° C. to 400° C. in the second step, and
   each surface potential of each electrochemical catalyst is controlled to 1.00 V to 1.50 V in the first step and in the second step.

7. A method for generating a hydrocarbon by a hydrocarbon generation system,
   the hydrocarbon generation system comprising a co-electrolysis cell and a hydrocarbon generation cell each connected to an external power source,
      wherein each of the co-electrolysis cell and the hydrocarbon generation cell has an electrochemical reactor, being configured to generate a hydrocarbon from carbon dioxide and water;
      the electrochemical reactor comprising:
      an oxygen-permeable electrolyte membrane, as well as
      a cathode and an anode disposed to either side of the electrolyte membrane,
      wherein the cathode is composed of an assembly;

the assembly comprising an electrochemical catalyst and a conductive metal joined with each other to form an interface; and the electrochemical catalyst comprising:
- a metal oxide composed of one or two or more of zirconium oxide, cerium oxide, yttrium oxide, gadolinium oxide, samarium oxide, cobalt oxide and scandium oxide; and
- a metal variant, having a valence different from that of a metal composing the metal oxide;

the method comprising:
- a first step of generating carbon monoxide and hydrogen by introducing a gas comprising carbon dioxide and water into the co-electrolysis cell heated, and abstracting oxygen from the carbon dioxide and the water; and
- a second step of generating the hydrocarbon by introducing a gas comprising the carbon monoxide and the hydrogen generated in the first step into the hydrocarbon generation cell heated, wherein each surface potential of each electrochemical catalyst in the co-electrolysis cell and the hydrocarbon generation cell is controlled by the external power source in the first step and in the second step.

8. The method for generating a hydrocarbon according to claim 7, wherein the co-electrolysis cell is heated to 600° C. to 800° C. in the first step, and the hydrocarbon generation cell is heated to 300° C. to 400° C. in the second step, and each surface potential of each electrochemical catalyst is controlled to 1.00 V to 1.50 V in the first step and in the second step.

9. The method for generating a hydrocarbon according to claim 8, wherein the metal variant is a rare earth metal.

10. The method for generating a hydrocarbon according to claim 7, wherein the metal variant is a rare earth metal.

* * * * *